US009432970B2

(12) United States Patent
Gou et al.

(10) Patent No.: US 9,432,970 B2
(45) Date of Patent: *Aug. 30, 2016

(54) METHOD AND DEVICE FOR TRANSMITTING MULTIMEDIA BROADCAST MULTICAST SERVICE NOTIFICATION MESSAGES

(75) Inventors: Wei Gou, Guangdong Province (CN); Zijiang Ma, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1033 days.

This patent is subject to a terminal disclaimer.

(21) Appl. No.: 13/258,098

(22) PCT Filed: Dec. 11, 2009

(86) PCT No.: PCT/CN2009/075509
§ 371 (c)(1),
(2), (4) Date: Jan. 6, 2012

(87) PCT Pub. No.: WO2011/011946
PCT Pub. Date: Feb. 3, 2011

(65) Prior Publication Data
US 2012/0127907 A1 May 24, 2012

(30) Foreign Application Priority Data
Jul. 28, 2009 (CN) .......................... 2009 1 0164963

(51) Int. Cl.
*H04W 72/04* (2009.01)
*H04W 4/06* (2009.01)
(Continued)

(52) U.S. Cl.
CPC ........ *H04W 72/005* (2013.01); *H04L 65/4076* (2013.01); *Y02B 60/50* (2013.01)

(58) Field of Classification Search
CPC ............ H04W 72/005; H04W 76/002; H04L 49/201; H04L 65/4076
See application file for complete search history.

(56) References Cited

U.S. PATENT DOCUMENTS

2005/0026607 A1  2/2005 Hwang et al.
2005/0076369 A1  4/2005 Cai et al.
(Continued)

FOREIGN PATENT DOCUMENTS

CN   101047528 A   10/2007
CN   101431788 A   5/2009
(Continued)

OTHER PUBLICATIONS

"Notification mechanism design for eMBMS", R2-093095, 3GPP TSG-RAN WG2 #66, May 4-8, 2009, pp. 1-3.*
(Continued)

*Primary Examiner* — Scott M Sciacca
(74) *Attorney, Agent, or Firm* — Ling Wu; Stephen Yang; Ling and Yang Intellectual Property

(57) ABSTRACT

A method and device for transmitting Multimedia Broadcast Multicast Service (MBMS) notification messages are provided in the present invention. The method comprises: transmitting the MBMS notification messages in the Physical Downlink Control Channel (PDCCH) in an idle sub-frame or a sub-frame having a minimal impact on the scheduling of other services, which is selected in a period of time window starting from the time of transmitting the MBMS notification messages; or transmitting the MBMS notification messages in the PDCCH of a Multimedia Broadcast over Single Frequency Network (MBSFN) sub-frame. The device comprises: a MBMS notification message generating module and a MBMS notification message transmitting module. Compared with the prior art, the method and device of the present invention will not cause the problem that a PDCCH public searching area of the sub-frame does not have enough carrying capability and can save a Radio Network Temporary Identity (RNTI) for the system.

11 Claims, 2 Drawing Sheets

(51) Int. Cl.
*H04W 72/00* (2009.01)
*H04L 29/06* (2006.01)

(56) References Cited

U.S. PATENT DOCUMENTS

| | | | |
|---|---|---|---|
| 2008/0045224 A1* | 2/2008 | Lu et al. | 455/446 |
| 2008/0232395 A1* | 9/2008 | Buckley | H04L 27/261 370/465 |
| 2009/0156225 A1* | 6/2009 | Angelow et al. | 455/450 |
| 2009/0238091 A1* | 9/2009 | Kim et al. | 370/252 |
| 2010/0034139 A1* | 2/2010 | Love | H04L 1/0029 370/328 |
| 2010/0174809 A1* | 7/2010 | Chun | H04W 48/08 709/221 |
| 2010/0189026 A1* | 7/2010 | Lee et al. | 370/312 |
| 2010/0232373 A1* | 9/2010 | Nory et al. | 370/329 |
| 2010/0271999 A1* | 10/2010 | Yu | H04B 7/155 370/312 |
| 2010/0272001 A1* | 10/2010 | Lee et al. | 370/312 |
| 2010/0273506 A1* | 10/2010 | Stern-Berkowitz | G01S 5/0009 455/456.1 |
| 2010/0279628 A1* | 11/2010 | Love et al. | 455/70 |
| 2010/0325504 A1* | 12/2010 | Lee | H04L 1/1812 714/748 |
| 2011/0007695 A1* | 1/2011 | Choi | H04L 5/0007 370/329 |
| 2011/0083066 A1* | 4/2011 | Chung | H03M 13/09 714/807 |
| 2012/0039228 A1* | 2/2012 | Wang | H04W 76/002 370/311 |

FOREIGN PATENT DOCUMENTS

| | | |
|---|---|---|
| EP | 1475973 A1 | 11/2004 |
| WO | 2004102901 A1 | 11/2004 |
| WO | 2008156309 A1 | 12/2008 |
| WO | 2009076308 A1 | 6/2009 |

OTHER PUBLICATIONS

"Report of email discussion [66#18] LTE: MBMS Notification", R2-093783, 3GPP TSG-RAN WG2 Meeting #66, Jun. 30-Jul. 3, 2009, pp. 1-6.*

International Search Report for PCT/CN2009/075509 dated Apr. 19, 2010.

* cited by examiner

METHOD AND DEVICE FOR TRANSMITTING MULTIMEDIA BROADCAST MULTICAST SERVICE NOTIFICATION MESSAGES

TECHNICAL FIELD

The present invention relates to Long Term Evolution (LTE) system, and in particular, to sub-frames for transmitting Multimedia Broadcast Multicast Service (MBMS) Notification information (MBMS Notification information) as well as a method and device for transmitting a Radio Network Temporary Identity (RNTI).

BACKGROUND ART

With the rapid development of Internet and the popularity of large-screen multifunctional mobile phones, there has been a large number of mobile data and multimedia services and a variety of high bandwidth multimedia services, such as video conferencing, TV broadcasting, video on demand, advertising, online education and interactive games, which not only meet the growing service requirements of mobile users, but also bring a new service growth point to mobile operators. These mobile data and multimedia services require multiple users to simultaneously receive same data, and compared with common data services, have characteristics such as a large amount of data, long duration, and latency-sensitive.

In order to effectively use the mobile network resources, the 3rd Generation Partnership Project (3GPP) proposes a MBMS service, which is a technology of transmitting data from one data source to multiple targets, thus achieving sharing the network (including a core network and an access network) resources and improving the utilization of the network resources (especially the air interface resources). The MBMS defined by 3GPP can not only achieve plain text, low-rate messages type multicast and broadcast, but also can achieve high-speed multimedia services broadcast and multicast, and provide a variety of abundant video, audio and multimedia services, which undoubtedly conforms to the trend of the development of future mobile data and provides better business prospects for the development of 3 G.

The characteristics of MBMS services are a large amount of data of the services, a long period during which the terminal receives data, and a constant average data rate. The above characteristics determine both the scheduling and control signaling configuration of the MBMS services are semi-static, i.e., both the scheduling information and the control signaling information of the MBMS services are kept "long-term" unchanged, and thus a periodic system side of each Multicast Control Channel (MCCH) information transmits unchanged information (It is always transmitted, because there may be a new user to access at any time). Thus, a terminal, which has received the MCCH information, does not need to receive unchanged MCCH information each time, which will cause the terminal to waste power, because the MCCH information has a large amount of information, and the process of receiving and parsing of the MCCH information will consume relatively more power. Therefore, it is proposed that one MCCH information update indication information (also referred to MBMS notification messages by some companies, and the present invention takes MBMS notification message as an example) is added, which use a small amount of information to describe whether the MCCH information is changed. The terminal which has access to the network just needs to monitor a small amount of information, and determines whether to receive the MCCH information according to the MBMS notification message.

In Long Term Evolution (LTE), the MBMS services can be transmitted by means of a mixed carrier, which means Unicast service (Unicast) and Multicast Service (MBMS service) are transmitted on the same carrier by means of time division multiplexing. The smallest unit used by time division multiplexing is one sub-frame. At present, the LTE defines that a two-stage method is used to configure radio frames and sub-frames carrying MBMS services.

At present, in the LTE, first one or two Orthogonal Frequency Division Multiplexing (OFDM) symbols in the MBSFN sub-frames are used to transmit the information of Unicast services, which is also known as Physical Downlink Control Channel (PDCCH), and the remaining resources in the sub-frames are used to transmit MBMS services or other services.

While it has been determined to introduce the MBMS notification message and to use PDCCH and it has been determined to use RNTIs at the present time, it has not been determined where RNTIs should be in the PDCCH and what kind of RNTI should be used. In addition, at present, there are a variety of sub-frames with different uses in the LTE, such as unicast sub-frames which are mainly used to transmit unicast traffic data, sub-frames mainly used to transmit paging messages, and MBSFN sub-frames which are mainly used to carry MBMS services and can also be used to carry data transmitted from the base station to the relay, therefore, it is more reasonable to select the PDCCH of these sub-frames.

SUMMARY

The technical problem to be solved by the present invention is to provide a method and device for transmitting Multimedia Broadcast Multicast Service (MBMS) notification messages, so as to cooperate with the transmission of the MBMS notification information.

With the introduction of the MBMS notification messages and the use of the PDCCH and the determination of using the RNTI, the MBMS notification messages being carried in a public searching area of the PDCCH is a priority to facilitate the terminal to quickly search for the MBMS notification messages. However, at present, the resources of the public searching area of the PDCCH are limited, and the public searching area of the PDCCH can carry the identified information corresponding to 3 RNTIs (System Information RNTI (SI-RNTI), Random Access RNTI (RA-RNTI) and Paging RNTI (P-RNTI) respectively) simultaneously at most. At present, the MBMS notification messages are implemented in need of being identified by one M-RNTI in the PDCCH. In order to ensure that the terminal can use less power to quickly receive and parse the information to which the M-RNTI corresponds, it is required to place the M-RNTI in the public searching area of the PDCCH. Since the resources of the public searching area are limited, the following problem must be addressed: if the identified information to which the M-RNTI corresponds and the information to which other three RNTIs correspond simultaneously present in the public searching area of the PDCCH of one sub-frame, the transmission of the information to which the above four RNTIs correspond will be influenced.

In order to solve the above problem, the present invention provides a method for transmitting Multimedia Broadcast Multicast Service (MBMS) notification messages, comprising:

transmitting the MBMS notification messages in the Physical Downlink Control Channel (PDCCH) of idle sub-frames or sub-frames having a minimal impact on the scheduling of other services, which are selected in a period of time window starting from the time of transmitting the MBMS notification messages; or transmitting the MBMS notification messages in the PDCCH of Multimedia Broadcast over Single Frequency Network (MBSFN) sub-frames.

Furthermore, the above method for transmitting is also characterized in that:

the MBMS notification messages are carried in a public searching area of the PDCCH of the idle sub-frames or the sub-frames having a minimal impact on the scheduling of other services, or the MBMS notification messages are carried in a public searching area of the PDCCH of a part or all of the MBSFN sub-frames carrying MBMS services.

Furthermore, the above method for transmitting is also characterized in that:

the idle sub-frames or the sub-frames having a minimal impact on the scheduling of other services are MBSFN sub-frames, or other sub-frames other than sub-frames carrying paging messages in non-MBSFN sub-frames.

Furthermore, the above method for transmitting is also characterized in that:

before transmitting the MBMS notification messages, further comprising:

adding Cycle Redundancy Check (CRC) bits to the MBMS notification messages, and scrambling the CRC bits with an arranged Radio Network Temporary Identity (RNTI) identifying the MBMS notification messages as a scrambling code.

Furthermore, the above method for transmitting is also characterized in that:

the arranged RNTI is one of cell RNTIs specified by the R9 protocol of a Long Term Evolution system; or the arranged RNTI is one of multiplexed System Information RNTI (SI-RNTI), Random Access RNTI (RA-RNTI) or Paging RNTI (P-RNTI).

Furthermore, the above method for transmitting is also characterized in that:

The MBMS services include MBMS traffic data and MBMS control information.

Furthermore, the above method for transmitting is also characterized in that:

the part or all of MBSFN sub-frames carrying the MBMS services are those carrying Multicast Control Channel (MCCH) information, and the transmission period of the MBMS notification messages is set as a multiple of the repetition period of the MCCH information.

Furthermore, the above method for transmitting is also characterized in that:

In the step of transmitting the MBMS notification messages in a PDCCH of the MBSFN sub-frames, the MBMS notification messages are carried and transmitted in the part or all of MBSFN sub-frames for transmitting MCCH information during the repetition period of the MCCH information. And during the modification period of the MCCH information, the MBMS notification messages transmitted multiple times are not changed.

Furthermore, the above method for transmitting is also characterized in that:

before transmitting the MBMS notification messages in a PDCCH of idle sub-frames or sub-frames having a minimal impact on the scheduling of other services, which is selected in a period of time window starting from the time of transmitting the MBMS notification messages, further comprising:

a transmitting terminal configuring the length of the time window, and notifying the receiving terminal of the configuration information; or the transmitting terminal and the receiving terminal arranging a determined length of the time window, with the arranged and determined length of the time window being 10 ms or 1 radio frame.

In order to solve the above problem, the present invention further provides a device for transmitting Multimedia Broadcast Multicast Service (MBMS) notification messages, comprising a MBMS notification message generating module and a MBMS notification message transmitting module, wherein, the MBMS notification message generating module is configured to construct the MBMS notification messages;

the MBMS notification message transmitting module is configured to transmit the MBMS notification messages constructed by the MBMS notification message generating module in the Physical Downlink Control Channel (PDCCH) of idle sub-frames or sub-frames having a minimal impact on the scheduling of other services, which is selected in a period of time window starting from the time of transmitting the MBMS notification messages; or transmit the MBMS notification messages constructed by the MBMS notification message generating module in the PDCCH of Multimedia Broadcast over Single Frequency Network (MBSFN) sub-frames.

Furthermore, the above device for transmitting is also characterized in that:

the MBMS notification messages are carried in a public searching area of the PDCCH of the idle sub-frames or the sub-frames having a minimal impact on the scheduling of other services, or the MBMS notification messages are carried in a public searching area of the PDCCH of a part or all of the MBSFN sub-frames carrying MBMS services.

Furthermore, the above device for transmitting is also characterized in that:

when constructing the MBMS notification messages, the MBMS notification message generating module is further configured to add Cycle Redundancy Check (CRC) bits to the MBMS notification messages, and scramble the CRC bits with the arranged Radio Network Temporary Identity (RNTI) identifying the MBMS notification messages as a scrambling code.

Furthermore, the above device for transmitting is also characterized in that:

the MBMS notification message transmitting module is further configured to use the MBSFN sub-frames carrying Multicast Control Channel (MCCH) information as those carrying the MBMS services, and set the transmission period of the MBMS notification messages as a multiple of the repetition period of the MCCH information.

The above method and device avoid the problem that the information to which the four RNTIs correspond simultaneously presents in the public searching area of the PDCCH of the sub-frames carrying the MBMS notification messages, and facilitate the terminal to quickly search and save power. In one embodiment, one of SI-RNTI, RA-RNTI and P-RNTI can be used as the M-RNTI to identify the MBMS notification messages in the public searching area of the PDCCH of the MBSFN sub-frames, so as to implement the transmission of the MBMS notification messages. As such, the present invention will not result in a problem that there is no enough space for carrying information in the public searching area of the PDCCH of the sub-frame, and one RNTI can also be saved for the system.

PREFERRED EMBODIMENTS OF THE PRESENT INVENTION

The following describes how to implement the transmission of MBMS notification messages in LTE R9.

In the present invention, the MBMS notification message is transmitted in PDCCH of Multicast Broadcast Single Frequency Network (MBSFN) sub-frames carrying the MBMS services.

Some of sub-frames in the MBSFN sub-frames are used to carry non-MSMS services (such as location traffic data). It is suggested in the present invention to use the MBSFN sub-frames to carry the MBMS notification messages. However, in order not to impact the transmission of other services in MBSFN sub-frames, in the present invention, the MBMS notification messages are preferably carried in the MBSFN sub-frames carrying the MBMS services, in which MBMS traffic data and MBMS control data information are included. The MBMS traffic data at least includes a MBMS Traffic Channel (MTCH), and the MBMS control data information at least includes a Multicast Control Channel (MCCH).

Furthermore, the MBMS notification messages can be carried in a public searching area of the PDCCH, allowing the terminal in need of search to quickly search for the corresponding information, which is helpful for the terminal to save power. The MBMS notification messages can also be carried in a non-public searching area of the PDCCH. However, when the MBMS notification messages are carried in the non-public searching area of the PDCCH, it probably will take more time for the terminal to search for the MBMS notification messages.

In order to further illustrate the present invention, it will be illustrated in detail in connection with drawings and embodiments.

The First Embodiment

Figure 1:
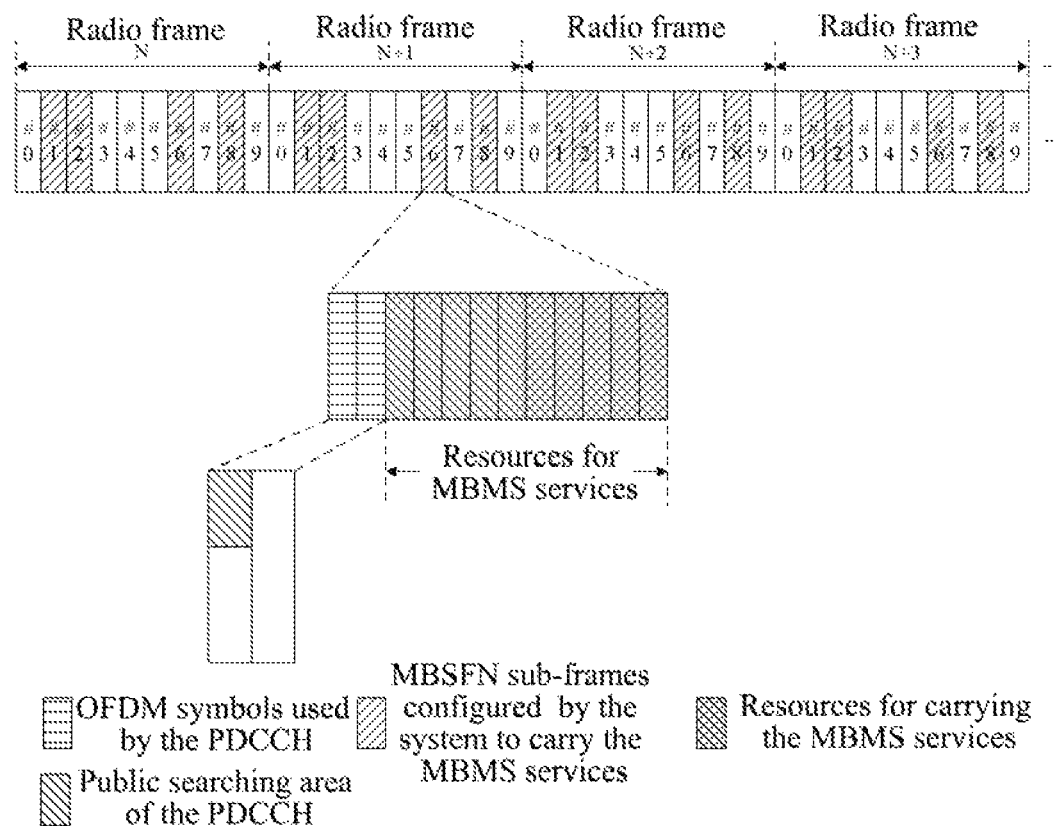
FIG. 1 is a diagram of PDCCH of the MBSFN sub-frames occupying 2 OFDM symbols according to the embodiment of the present invention.
Figure 2:
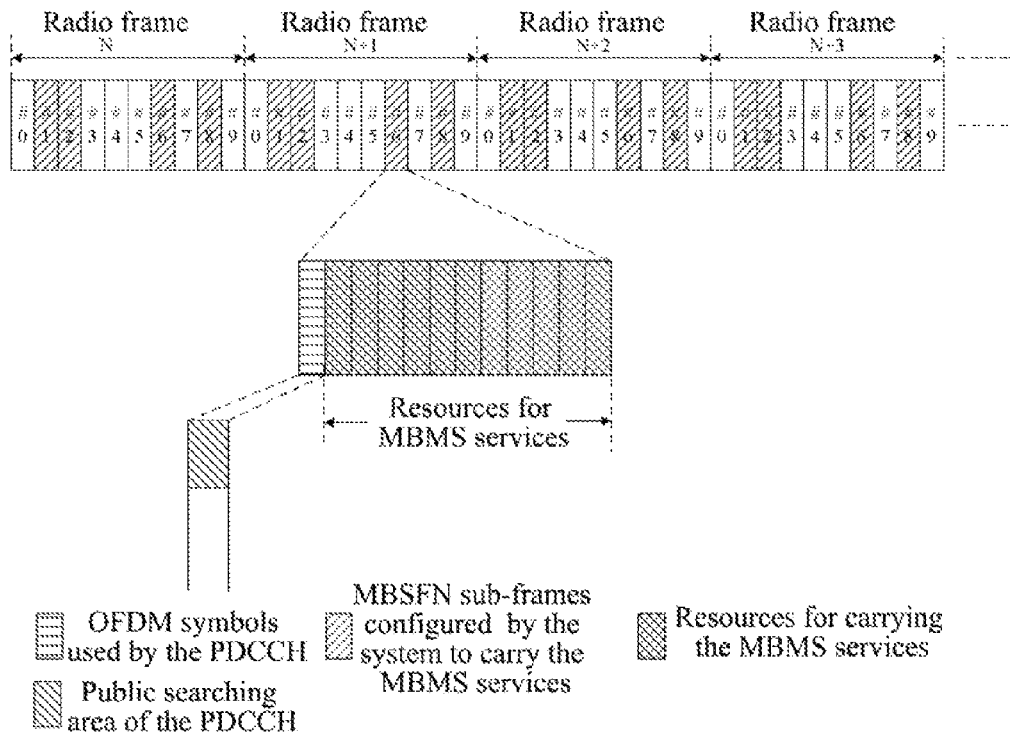
FIG. 2 is a diagram of PDCCH of the MBSFN sub-frames occupying 1 OFDM symbol according to the embodiment of the present invention.

In the present embodiment, the MBMS notification messages are carried in the MBSFN sub-frames, and more specifically, the MBMS notification messages are transmitted in the PDCCH using an M-RNTI. The M-RNTI is not the RNTI arranged for SI-RNTI or P-RNTI or RA-RNTI. The M-RNTI can be carried in the first one or two OFDMs of the MBSFN sub-frames, are shown in FIGS. 1 and 2.

Figure 3:
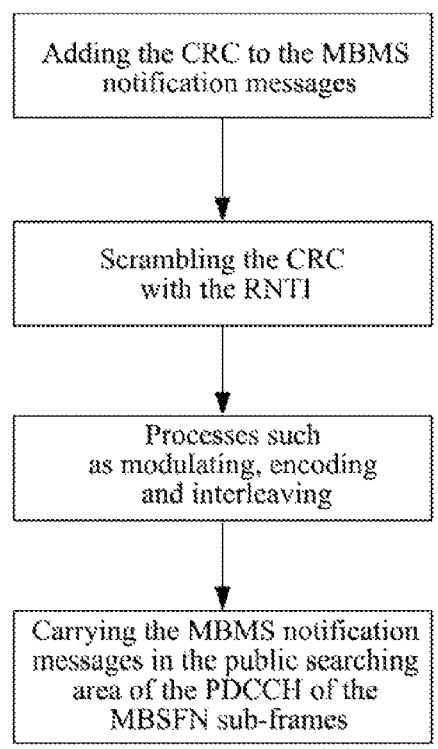
FIG. 3 is a flowchart of generation of MBMS notification messages according to the embodiment of the present invention.

The MBMS notification messages carried in the PDCCH can be implemented by the arranged RNTI. The term "arranged RNTI" refers to the RNTI which is specified by the LTE R9 protocol and can be understood by the terminal without further notification. The specific implementation, as shown in FIG. 3, can be as follows: adding Cyclic Redundancy Check (CRC) bits to the MBMS notification messages, and then scrambling the CRC with the arranged RNTI, for example, by means of bitwise exclusive OR (for more details, see the method in chapter 5.3.3.2 in 36.212_870). Thus, the arranged RNTI is implied in the MBMS notification messages to which the CRC bits are added. Then, the data to be transmitted can be obtained by necessary processes which are arranged by protocols such as interleaving etc., after modulating and channel encoding the obtained data. Specifically, when the data to be transmitted is transmitted, the data to be transmitted is carried in a public searching area of the PDCCH of the selected MBSFN sub-frames, which facilitates the terminal to quickly search the MBMS notification messages including the M-RNTI. Specifically, when the MBMS notification messages are transmitted, the MBMS notification messages are transmitted directly in the MBSFN sub-frames.

As the public searching area of the PDCCH may include other signaling, the above arranged RNTI is implied in the MBMS notification messages to which the CRC bits are added, in order to identify the MBMS notification messages, with the RNTI being represented as the M-RNTI herein. After the terminal completes the decoding of some signaling in the public searching area, the CRC bits therein are decoded with the M-RNTI, and then the signaling is checked against the descrambled CRC bits. If the check passes, the signaling is determined as a MBMS notification message.

Furthermore, as the MBMS notification messages should have a higher reliability, and the public searching area is large enough, it is suggested to use a Modulation and Coding Scheme (MCS) to which 8 Control Channel Elements (CCEs) correspond for transmission.

The embodiment can obtain the following benefits:

According to the current LTE protocol, the public searching area of the PDCCH of the sub-frames can simultaneously carry SI-RNTI, RA-RNTI and P-RNTI at most, and the information is included in the same way as the M-RNTI (i.e., as scrambling code to scramble the CRC bits) described above. As the SI-RNTI, RA-RNTI and P-RNTI may simultaneously present in the same sub-frame, further addition of a MBMS notification message of the arranged M-RNTI will result in lack of space for carrying information in the public searching area of the PDCCH of the sub-frame, or the carried MCS requirements are not met. Therefore, it is must be avoided that 4 RNTI corresponded information simultaneously present in the public searching area of the PDCCH of the sub-frame.

According to the provisions of the LTE R9 protocol, the information to which the SI-RNTI and P-RNTI correspond will not present in the MBSFN sub-frames, and thus, in the present embodiment, the MBMS notification messages are carried in the MBSFN sub-frames, so as to avoid the above 4 RNTI simultaneously present in the public searching area of the PDCCH of one sub-frame. Therefore, the transmission of MBMS notification messages is achieved, and the MBMS notification messages are carried in the public searching area of the PDCCH of the sub-frame for transmission, which facilitates the terminal to quickly search and save power, without disturbing the terminal of LTE R8 to receive and search the public searching area of the PDCCH. LTE R9 protocol has been least affected.

The Second Embodiment

In the present embodiment, the MBMS notification messages are carried in the MBSFN sub-frames used to transmit MBMS services. Furthermore, the MBMS notification messages being transmitted in the public searching area of the PDCCH of the selected sub-frames is implemented by multiplexing the existing other three RNTI, i.e., SI-RNTI, or P-RNTI or RA-RNTI which are determined to be placed in the public searching area. Specifically, the utilization of one or more of the SI-RNTI, P-RNTI and RA-RNTI are to be arranged by using protocols, without signaling to the terminal. Using the SI-RNTI, P-RNTI or RA-RNTI which is not used in the MBSFN sub-frames can save the RNTI resources.

When the MBMS notification messages are transmitted in one modification period of the MCCH information, suitable MBSFN sub-frames for carrying MBMS services are selected to carry the MBMS notification messages, and specifically, the MBMS notification messages are transmitted in the PDCCH of the MBSFN sub-frames. As the transmission of MBMS notification messages per se is regular, for example, periodic, if the transmission period and the starting time of the MBMS notification message are known, the time for transmitting each MBMS notification message can be inferred, and the suitable MBSFN sub-frames can be found.

Specifically, the CRC bits are added to the MBMS notification messages, and then the SI-RNTI or P-RNTI or RA-RNTI is used to scramble the CRC bits (specifically, see the method in chapter 5.3.3.2 in 36.212_870), then the obtained information is channel encoded, and then the data to be transmitted is obtained by necessary processes. Specifically, when the data to be transmitted is transmitted, the data to be transmitted is carried in the public searching area of the PDCCH of the selected MBSFN sub-frames, which facilitates the terminal to quickly search the MBMS notification messages including the SI-RNTI or P-RNTI or RA-RNTI.

The following benefits can be obtained from the above implementation of the present invention. According to current LTE protocol, the public searching area of the PDCCH of the sub-frames can simultaneously carry SI-RNTI, RA-RNTI and P-RNTI at most. As the above SI-RNTI, RA-RNTI and P-RNTI may not simultaneously present in the MBSFN sub-frames (The protocol does not specify for RA-RNTI, but SI-RNTI and P-RNTI certainly will not present in the MBSFN sub-frames simultaneously), therefore, at this time, the transmission of MBMS notification messages is implemented by using one of the SI-RNTI, RA-RNTI and P-RNTI as the M-RNTI to identify the MBMS notification messages in the public searching area of the PDCCH of the MBSFN sub-frames. As such, it will not result in a problem that there is no enough space for carrying information in the public searching area of the PDCCH of the sub-frames, and one RNTI can be saved for the system, which facilitates the terminal to quickly search and save power.

The Third Embodiment

In the present embodiment, the transmission time window of the MBMS notification message is introduced, and the suitable sub-frame is selected by using a time window mechanism to transmit the MBMS notification messages, which can facilitate the transmitting terminal in scheduling.

For example, a 10 ms time window is introduced for the MBMS notification messages. When the transmission period of the MBMS notification messages comes, a further 10 ms transmitting window is delayed, i.e., in 10 ms after the period of the MBMS notification messages comes, the transmitting terminal can select idle sub-frames or sub-frames having a minimal impact on the scheduling of other services to carry the MBMS notification messages, thus facilitating the transmitting terminal in scheduling. The time window can be counted in milliseconds, or can be counted in the number of radio frames, for example, the duration of the time window is specified as one radio frame, i.e., the transmitted radio frame of the MBMS notification messages, and the suitable sub-frame is selected from the radio frames to carry the MBMS notification messages. If this mechanism is not introduced, the transmitting terminal will be busy scheduling other services (assuming the services are relatively busy) and has no time to schedule the MBMS notification messages when the transmission period of the MBMS notification messages comes. The transmission of the MBMS notification messages will be delayed, or the scheduling of the MBMS notification messages will delay the scheduling of other services. Once the mechanism of transmission time window is introduced, the transmitting terminal can schedule the MBMS notification messages in the next sub-frame. As such, the robustness of the system is enhanced, which makes the scheduling more flexible.

The receiving terminal searches for the arranged RNTI in the PDCCH on a sub-frame by sub-frame basis in the time window when the period of the notification messages comes, until the arranged RNTI is found, and the MBMS notification messages is obtained.

An idle sub-frames or sub-frames having a minimal impact on the scheduling of other services are MBSFN sub-frames or sub-frames other than paging sub-frames in the non-MBSFN sub-frames. The transmitting terminal preferably selects MBSFN sub-frames in the time window to carry the MBMS notification messages. Other sub-frames may also be used.

The transmission time window can be determined as arranged. The transmission time window can also be configured by the transmitting terminal, and then the transmitting terminal notifies the receiving terminal of the length of the time window. The transmission time window is determined as arranged in the above embodiment. Arranging the length of the time window is preferred. For example, the length of the time window is arranged as 10 ms or one radio frame.

The Fourth Embodiment

In the present embodiment, the MBMS notification messages are carried in the MBSFN sub-frames for transmitting the MCCH information, that is, the MBMS notification messages are carried in the PDCCH of a part or all of the sub-frames where the MCCH information present.

As the MCCH information is transmitted periodically, there may be a condition where the period thereof and the transmission period of the MBMS notification messages are inconsistent. In this case, one period can be set at multiples of the other period, and the transmission period of the MBMS notification messages can be longer than or equal to the period of the MCCH information. This guarantees that there is at least one MBSFN sub-frame for transmitting the MCCH information during the transmission period of each MBMS notification message, so that the MBMS notification messages can be carried in the PDCCH of a part or all of the MBSFN sub-frames for transmitting the MCCH information.

Since the period of the MCCH information can be classified into a repetition period and a modification period, and typically the MCCH modification period is a multiple of the MCCH repetition period, one modification period includes one or a number of repetition period of the MCCH information. The MCCH information transmitted in each repetition period during one modification period is specified to be the same. Similarly, if the MBMS notification messages are carried in the part or all of the MBSFN sub-frames for transmitting the MCCH information in the repetition period of MCCH information, the MBMS notification messages transmitted multiple times during the modification period should not be changed.

Where the MBMS notification messages are carried in the PDCCH, the MBMS notification messages are preferably carried in the public searching area of the PDCCH so as to facilitate the terminal to quickly search. One of the operations is provided, but the present invention is not limited to this operation: the CRC bits are added to the MBMS notification messages; the obtained CRC bits are scrambled with an arranged RNTI (here the first and the second embodiments can be referred to); the subsequent processes are implemented based on the channel encoding specified by the protocols etc.; and the obtained information is mapped to the public searching area of the PDCCH for transmission.

The present embodiment discloses a transmitting device for implementing the above transmitting method, which comprises a MBMS notification message generating module and a MBMS notification message transmitting module, wherein, the MBMS notification message generating module is used to construct the MBMS notification messages;

the MBMS notification message transmitting module is used to transmit the MBMS notification messages in a PDCCH of idle sub-frames or sub-frames having a minimal impact on the scheduling of other services, which are selected in a period of time window starting from the time of transmitting the MBMS notification messages; or transmit the MBMS notification messages constructed by the MBMS notification message generating module in the PDCCH of a part of all of MBSFN sub-frames carrying the MBMS services.

Preferably, the MBMS notification messages are carried in the public searching area of the Physical Downlink Control Channel.

While constructing the MBMS notification messages, the MBMS notification message generating module adds CRC bits to the MBMS notification messages, and scrambles the CRC bits with the arranged Radio Network Temporary Identity (RNTI) identifying the MBMS notification messages as a scrambling code.

While transmitting the MBMS notification messages at the MBMS notification messages transmitting time, the MBMS notification message transmitting module uses the MBSFN sub-frames carrying MCCH as the MBSFN sub-frames carrying the MBMS notification messages, and sets the transmission period of the MBMS notification messages as a multiple of the repetition period of the MCCH information.

INDUSTRIAL APPLICABILITY

Compared with the prior art, the method and device of the present invention do not result in the problem that the public searching area of the PDCCH of the sub-frames do not have enough space for carrying information, and one RNTI also can be saved for the system.

What we claim is:

1. A method for transmitting Multicast Control Channel (MCCH) information update indication information, comprising:

constructing Multicast Control Channel (MCCH) information update indication information;

adding Cycle Redundancy Check (CRC) bits to the MCCH information update indication information in a Physical Downlink Control Channel (PDCCH), and scrambling the CRC bits with an arranged Radio Network Temporary Identity (RNTI) identifying the MCCH information update indication information as a scrambling code; and transmitting the MCCH information update indication information in a public searching area of the PDCCH of a Multimedia Broadcast over Single Frequency Network (MBSFN) sub-frame which does not carry control information corresponding to System Information RNTI (SI-RNTI), Random Access RNTI (RA-RNTI) and Paging RNTI (P-RNTI) simultaneously;

wherein the MCCH information update indication information is carried in the PDCCH of MBSFN sub-frames by an arranged RNTI.

2. The method according to claim 1, wherein the MCCH information update indication information is carried in a public searching area of the PDCCH of a part or all of the MBSFN sub-frames carrying MBMS services.

3. The method according to claim 2, wherein, the MBMS services include MBMS traffic data and MBMS control information.

4. The method according to claim 3, wherein, the part or all of MBSFN sub-frames carrying the MBMS services are the MBSFN sub-frames carrying MCCH information, and a transmission period of the MCCH information update indication information is set as a multiple of a repetition period of the MCCH information.

5. The method according to claim 2, wherein the MCCH information update indication information is carried and transmitted in the part or all of MBSFN sub-frames for transmitting MCCH information during a repetition period of the MCCH information, and during a modification period of the MCCH information, the MCCH information update indication information transmitted multiple times are not changed.

6. The method according to claim 2, further comprising:

before transmitting the MCCH information update indication information, adding the CRC bits to the MCCH information update indication information, and scrambling the CRC bits with the arranged RNTI identifying the MCCH information update indication information as the scrambling code.

7. The method according to claim 1, wherein, the arranged RNTI is one of cell RNTIs specified by the R9 protocol of a Long Term Evolution (LTE) system; or the arranged RNTI is one of multiplexed System Information RNTI (SI-RNTI), Random Access RNTI (RA-RNTI) or Paging RNTI (P-RNTI).

8. A computer-readable memory device comprising a set of instructions stored therein which, when executed by a processor, cause the processor to:

construct Multicast Control Channel (MCCH) information update indication information;

add Cycle Redundancy Check (CRC) bits to the MCCH information update indication information in a Physical Downlink Control Channel (PDCCH), and scramble the CRC bits with an arranged Radio Network Temporary Identity (RNTI) identifying the MCCH information update indication information as a scrambling code;

transmit the MCCH information update indication information in a public searching area of the PDCCH of a Multimedia Broadcast over Single Frequency Network (MBSFN) sub-frame which does not carry control information corresponding to System Information RNTI (SI-RNTI), Random Access RNTI (RA-RNTI) and Paging RNTI (P-RNTI) simultaneously; and carry the MCCH information update indication information in the PDCCH of MBSFN sub-frames by an arranged RNTI.

9. The computer-readable memory device according to claim 8, wherein the instructions further cause the processor to:

carry the MCCH information update indication information in a public searching area of the PDCCH of a part or all of the MBSFN sub-frames carrying MBMS services.

10. The computer-readable memory device according to claim 9, wherein the instructions further cause the processor to:

use the MBSFN sub-frames carrying MCCH information as the MBSFN sub-frames carrying the MBMS services, and set the transmission period of the MCCH information update indication information as a multiple of the repetition period of the MCCH information.

11. The computer-readable memory device according to claim 9, wherein the instructions further cause the processor to:

while constructing the MCCH information update indication information, add the CRC bits to the MCCH information update indication information, and scramble the CRC bits with the arranged RNTI identifying the MCCH information update indication information as the scrambling code.

* * * * *